(12) United States Patent
Hirasawa

(10) Patent No.: US 6,587,872 B2
(45) Date of Patent: Jul. 1, 2003

(54) NETWORK SYSTEM AND NETWORK MANAGEMENT METHOD

(75) Inventor: Hajime Hirasawa, Kyoto (JP)

(73) Assignee: Faith Inc., Kyoto (JP)

( * ) Notice: Subject to any disclaimer, the term of this patent is extended or adjusted under 35 U.S.C. 154(b) by 0 days.

(21) Appl. No.: 09/834,152

(22) Filed: Apr. 12, 2001

(65) Prior Publication Data
US 2001/0021952 A1 Sep. 13, 2001

Related U.S. Application Data

(63) Continuation of application No. 08/765,152, filed as application No. PCT/JP95/01215 on Jun. 19, 1995, now abandoned.

(30) Foreign Application Priority Data

Jun. 20, 1994 (JP) .............................................. 6-136819

(51) Int. Cl.[7] .......................................... G06F 15/173
(52) U.S. Cl. ...................... 709/217; 709/201; 709/203; 709/218; 709/219; 380/232; 713/200; 713/201; 713/202
(58) Field of Search ................................. 709/201–203, 709/200.27–200.28, 217–219; 712/200.48–200.49, 200.55–200.59, 200.78; 380/232; 713/200–202

(56) References Cited

U.S. PATENT DOCUMENTS

| 5,023,907 A | 6/1991 | Johnson et al. |
| 5,155,847 A | 10/1992 | Kirouac et al. |
| 5,263,157 A | 11/1993 | Janis |
| 5,548,727 A | 8/1996 | Needan |
| 5,586,937 A | 12/1996 | Menashe |

FOREIGN PATENT DOCUMENTS

| BR | 1 005 100 | | 4/1993 |
| JP | 61-216066 | | 9/1986 |
| JP | 62-123539 | | 6/1987 |
| JP | 62-198248 | | 9/1987 |
| JP | 63-90262 | | 4/1988 |
| JP | 63-090262 | * | 4/1988 |
| JP | 3-219742 | * | 9/1991 |
| JP | 4-216252 | | 8/1992 |
| JP | 5-128070 | | 5/1993 |

OTHER PUBLICATIONS

1994, Patent Abstracts of Japan, vol. 18, No. 447 (E–1594), Aug. 19, 1994 & JP 6–141083 A, Ricoh Co. Ltd., May 20, 1994.

1993, "Transmission Control Protocol/Internet Protocol Networking over Netbios"; IBM Technical Disclosure Bulletin, vol. 36, No. 12, Dec. 1, 1993, pp. 619–624, XP002121686.

1991, Patent Abstracts of Japan, vol. 15, No. 94 (E–1041), Mar. 6, 1991 & JP 02 305140A (Ricoh Co Ltd), Dec. 18, 1990.

* cited by examiner

Primary Examiner—Robert B. Harrell
Assistant Examiner—Hieu Le
(74) Attorney, Agent, or Firm—Merchant & Gould P.C.

(57) ABSTRACT

This invention aims at providing a network system having high flexibility and easy changeability. When software programs α, β, and γ are run in terminal computers $14_1$ to $14_6$, a host computer (10) builds software networks α, β, γ (FIG. A). When the software is changed from the program α to β at the terminal computer $14_3$, the terminal, computer $14_3$ is switched and connected to the network β. Similarly, the terminal computer $14_4$, is switched and connected to the network β. In other words, a flexible network can be formed in accordance with the software used by the terminal computer. Further, management of an accessing party becomes easier by using a personal ID.

18 Claims, 14 Drawing Sheets

NETWORK SYSTEM AND NETWORK MANAGEMENT METHOD

This application is a continuation of application Ser. No. 08/765,152, filed Dec. 11, 1996, now abandoned, which is a 371 of PCT/JP95/01215, filed Jan. 19, 1995 which application(s) are incorporated herein by reference.

FIELD OF INVENTION

This invention relates to a network system, in particular to creating flexibility and change ability, and to improvement in manageability for an operator who makes access to it.

BACKGROUND ART

FIG. 14 shows a typical network system. To a host computer 2 are connected a plurality of terminal computers $6_1, 6_2, 6_3, \ldots, 6_n$. Each of the terminal computers $6_1, 6_2, 6_3, \ldots, 6_n$ can use the software in the host computer 2. Also, the data in the host computer 2 may be shared with the terminal computers $6_1, 6_2, 6_3, \ldots, 6_n$. Therefore, an important advantage is provided, for example, in creating a database updated by the terminal computers $6_1, 6_2, 6_3, \ldots, 6_n$. Another advantage is that the terminal computers $6_1, 6_2, 6_3, \ldots, 6_n$ can exchange data among themselves through the host computer 2.

DISCLOSURE OF THE INVENTION

However, conventional network systems such as described above have the following problems.

The terminal computers $6_1, 6_2, 6_3, \ldots, 6_n$ respectively have hardware IDs or software protocols by means of which the host computer 2 manages the terminal computers $6_1, 6_2, 6_3, \ldots, 6_n$. Therefore, when the terminal computers $6_1, 6_2, 6_3, \ldots, 6_n$ are to be changed in number or type, cumbersome work is required to change the hardware IDs or software protocols of the terminal computers or to change terminal computer registration on the side of the host computer 2. This prevents the network constitution (connection state of the terminal computers) from being changed flexibly according to the purpose of use of the network.

Another problem with the conventional arrangement in which the management is made at each terminal is that the host computer cannot identify a person who makes access to a terminal computer. As a result, the accessing person is unknown and accurate management is impossible.

Another problem is that, when a network is created through a public communication line, the public communication line has to be connected all the time. This is uneconomical.

The object of the invention is to provide a network system capable of solving the above problems, with advantages of flexibility, changeability, economy, and accurate management of the accessing person.

The network management method and the network system are characterized in that a software program started in each terminal computer is provided with a software code in advance and that the host computer creates a network of software programs, having the same software code, chosen from among the software programs which are started at respective terminal computers. By the way, the term "network" as used herein refers to a state in which the host computer is connected to one or more terminal computers.

The network management method and the network system are also characterized in that a host computer discriminates authenticity of a user ID sent from each of the terminal computers, permits access only when the user ID is authentic, and creates a network.

The network connection possibility display method is characterized in that accessible networks only are displayed on a display device on the basis of user ID codes.

The network management method and the network system are further characterized in that a host computer stores programs or data corresponding to respective networks and that the host computer creates a network by interconnecting the programs or data when creating the network with software programs having the same software code.

The network management method and the network system are still further characterized in that when a software program running on a terminal computer requests data and the data are stored in the terminal computer, the data are obtained from the terminal computer and that when the data are stored in a host computer, the terminal computer is connected to the host computer through a communication path and the data are obtained from the host computer.

The network management method and the network system are also characterized in that when data to be obtained are stored in a host computer, the terminal computer is connected to the host computer through a communication path and the data are obtained from the host computer while both of the computers remain in the state of connection and then the connection is broken.

The network management method and the network system are also characterized in that when data to be obtained are stored in both a host computer and a terminal computer, the terminal computer is connected to the host computer through a communication path, the data in the host computer are compared with the data in the terminal computer and, if the data in the host computer have been updated, the connection is broken after at least the updated portion of the data are copied and stored from the host computer to the terminal computer and, if both data are identical to each other, the connection is broken in that state.

The network management method and the network system are farther characterized in that when data to be obtained are stored in a host computer, the terminal computer is connected to the host computer through a communication path, the data in the host computer are copied from the host computer and stored in the terminal computer and then the connection is broken, and thereafter the data are obtained from the terminal computer.

The network management method and the network system are also characterized in that when data to be obtained are stored in a host computer but cannot be copied, the terminal computer is connected to the host computer through a communication path, the data in the host computer are obtained while both of the computers remain in the state of connection and then the connection is broken.

The network management method and the network system are still further characterized, in that a host computer discriminates authenticity of a user ID sent from each of the terminal computers and permits connection to the host computer only when the user ID is authentic.

The characteristics, other objects, applications, and effects of the invention will be made clear in reference to embodiments and appended drawings.

PREFERRED EMBODIMENTS OF THE INVENTION

Figure 2:
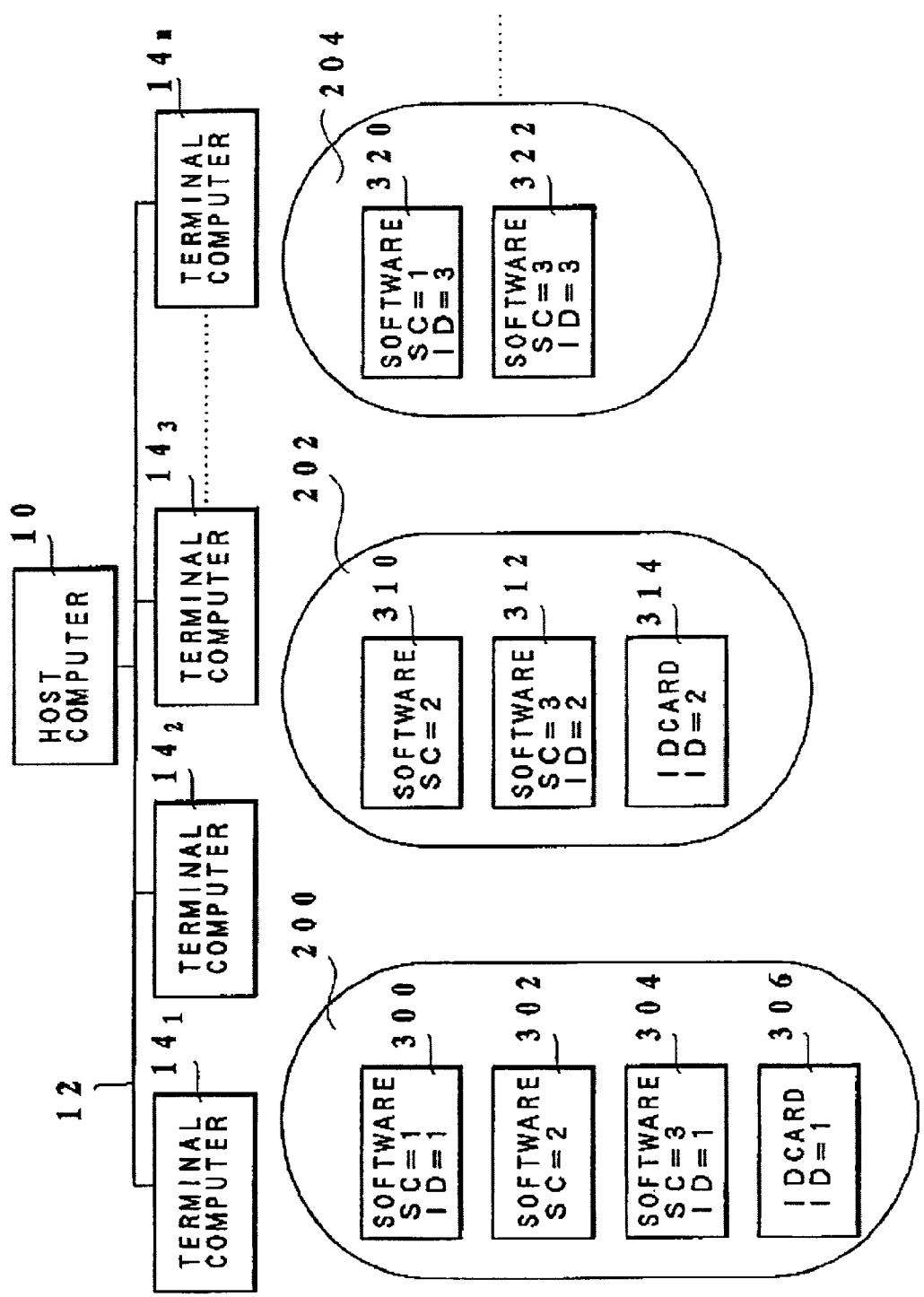
FIG. 2 shows the entire structure of the network as an embodiment of the invention.

FIG. 2 shows the entire structure of the network as an embodiment of the invention. A plurality of terminal computers $14_1$, $14_2$, $14_3$, ..., $14_n$ are connected through a connection path 12 to a host computer 10. Users 200, 202, 204, ... have software programs for use in the terminal computers $14_1$, $14_2$, $14_3$, ..., $14_n$ respectively. These software programs are stored in portable recording media (such as optical disks and magnetic disks) to be read with reading devices (such as optical disk drives and magnetic disk drives), or they may be stored in a storage (such as hard disks) in the terminal computers $14_1$, $14_2$, $14_3$, ..., $14_n$.

The software programs used by the users are respectively provided with software codes, SC=1, 2, 3, ..., K. In other words, an identical software program is provided with a same software program code.

Users permitted to access the network have been provided with respective user identification (ID) codes (ID=1, 2, 3, ..., N). For example, the user 200 has the ID=1, the user 202 has the ID=2, the user 204 has the ID=3, and so on. These personal IDs are stored in the software programs in the following manner.

When a magnetic disk or the like in which a software program is stored is to be sent from a vendor to a user by mail or the like, the user sends an order for the magnetic disk while disclosing the user's predetermined ID. The software vendor records the user's ID in the software on the magnetic disk and sends it to the user. In this way, the personal IDs of the users are recorded respectively in the users' software programs.

In the cases other than the direct order (such as the package purchase at retail shops on the market), the users' IDs are not recorded on the magnetic disks at the time of sale. In that case, the user applies for on-line recording of the personal ID from the terminal computer to the host computer so that the user's personal ID is recorded on the magnetic disk inserted in the terminal computer drive.

Furthermore, in case the software is recorded in the read-only medium such as on a CD-ROM, a separate magnetic card or the like in which the personal ID is recorded may be provided to the user (Refer to the magnetic cards 306, 314 shown in FIG. 2).

In any case, every user receives one personal ID in principle.

Figure 3:
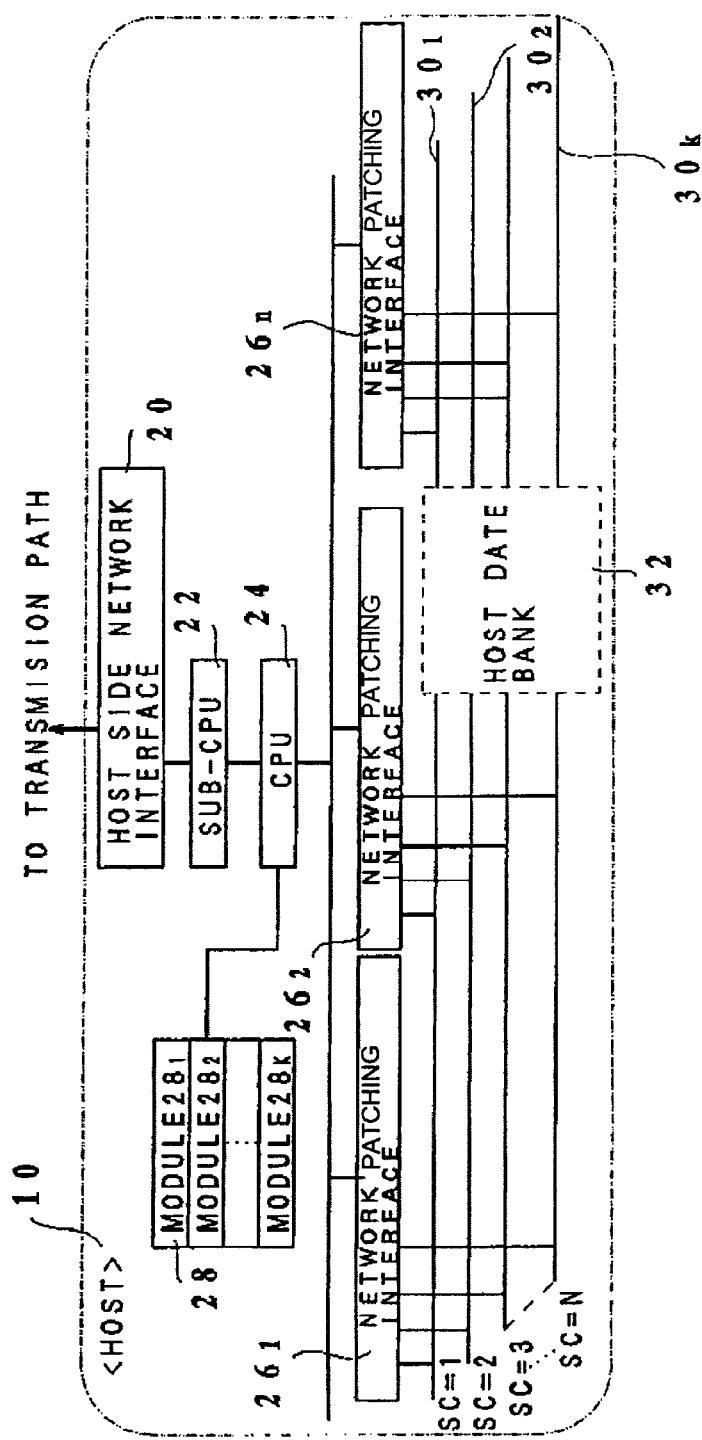
FIG. 3 shows the constitution of a host computer 10.

A detailed constitution of the host computer 10 is shown in FIG. 3 The host computer 10 comprises a transmitting-receiving means or a host side network interface 20, a sub-CPU 22, and a CPU 24. The CPU 24 is connected to a module memory device 28 in which modules $28_1$, $28_2$, ..., $2_n$ required for executing software are stored. Some kinds of software can operate without requiring these modules. The CPU 24 is also provided with network patching interfaces $26_1$, $26_2$, ..., $26_n$ corresponding to the terminal computers $14_1$, $14_2$, $14_3$, ..., $14_n$ respectively. The network patching interfaces $26_1$, $26_2$, ..., $26_n$ are controlled by the CPU 24 to make network connection. The network patching interfaces $26_1$, $26_2$, ..., $26_n$ are connected to network lines $30_1$, $30_2$, ..., $30_k$, respectively. The network lines $30_1$, $30_2$, ..., $30_k$ are connected to a host data bank 32 which stores data corresponding to respective software. The network patching interfaces and the network lines may also be established with hardware or software, or with both hardware and software.

Figure 4:
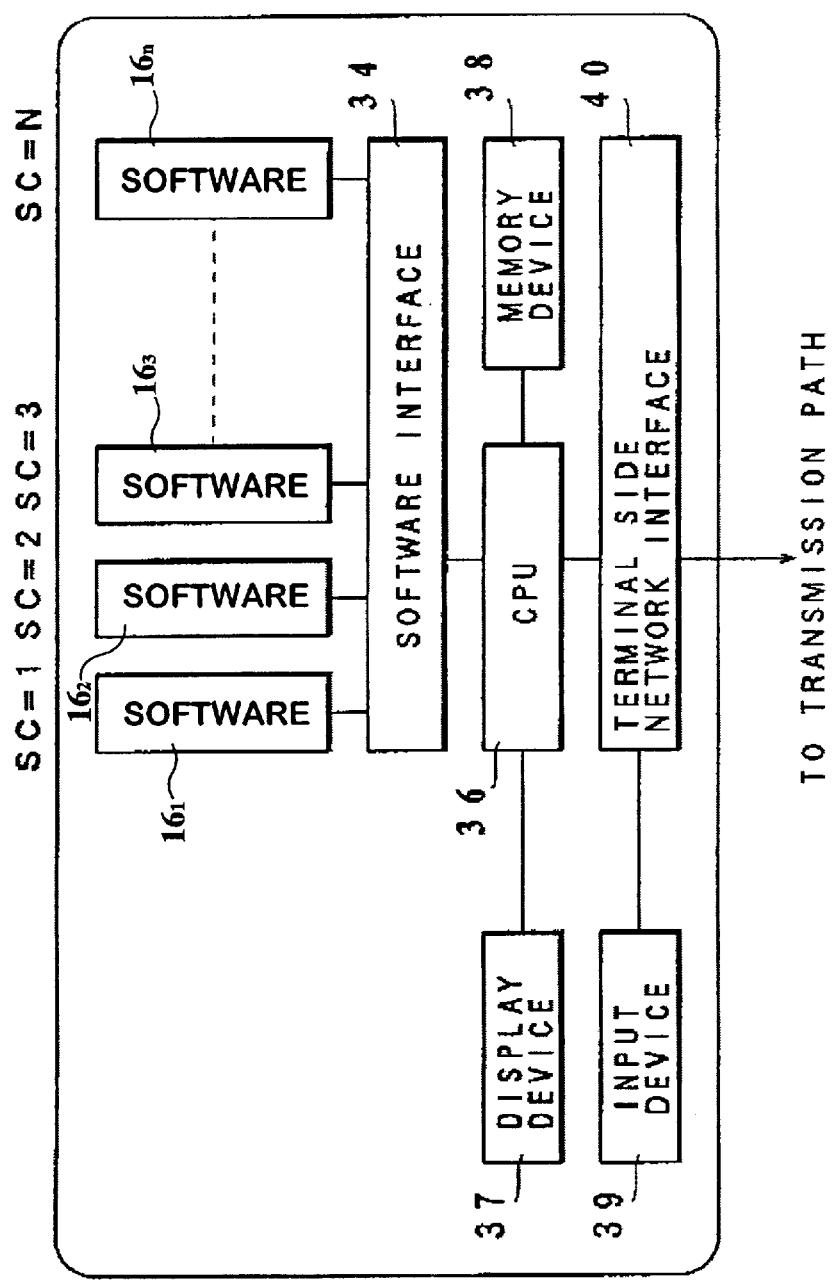
FIG. 4 shows the constitution of a terminal computer 14.

A detailed constitution of the terminal computer 14 is shown in FIG. 4. The terminal computer 14 as transmitting means is provided with a terminal side network interface 40, a CPU 36, and a memory device 38. The CPU 36 controls the operation of softwares $16_1$, $16_2$, ..., $16_n$. The memory device 38 secures a memory area for processing. A software interface 34 creates connection between the softwares $16_1$, $16_2$, ..., $16^n$ and the network. The term "software interface 34" mentioned here refers to a floppy disk drive when the software is stored in a floppy disk, and a CD-ROM drive when the software is stored in a CD-ROM. Furthermore, a card reader for reading a personal ID stored on a magnetic card also corresponds to the software interface 34.

Figure 5:
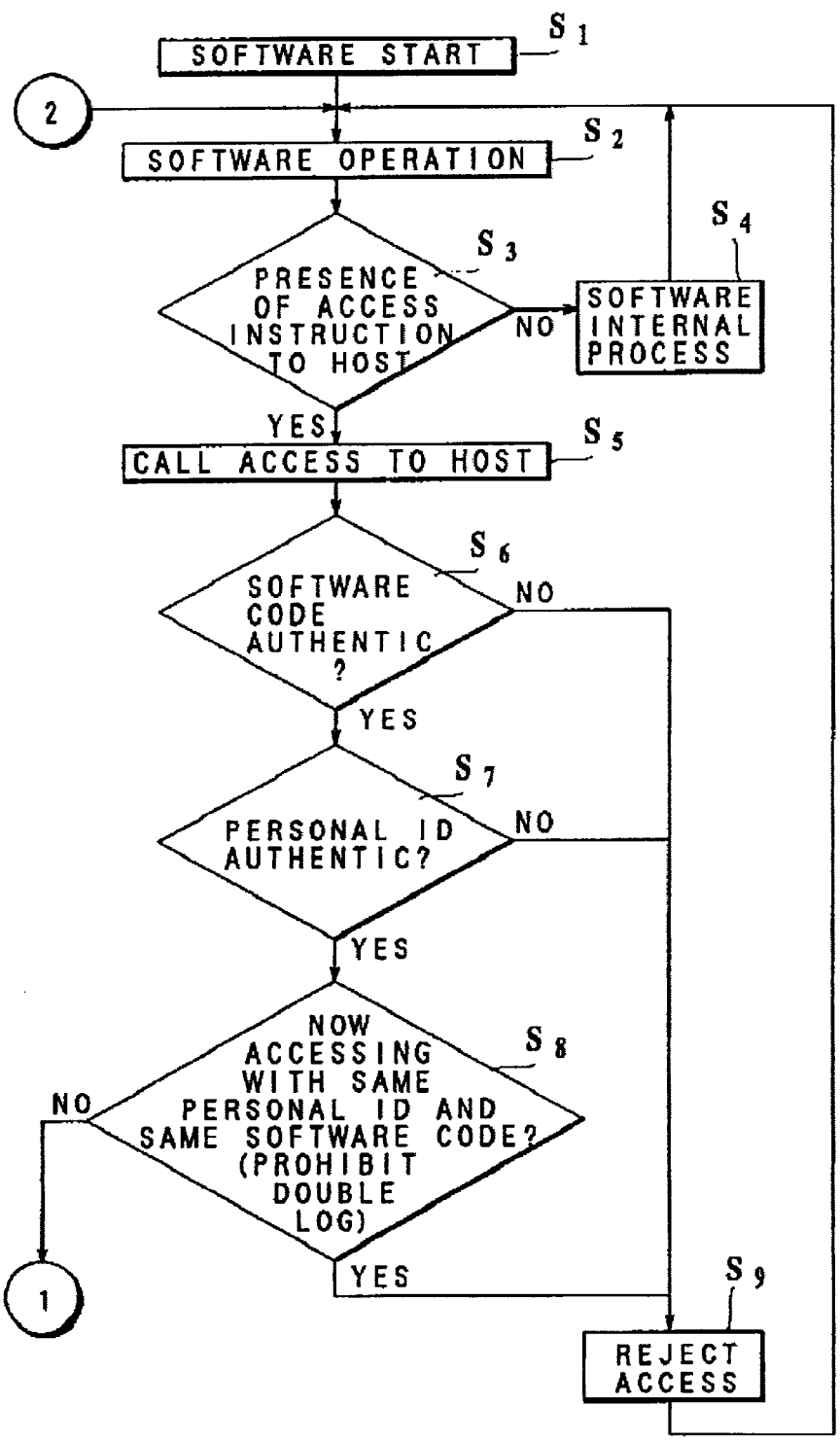
FIG. 5 and FIG. 6 show the operation of the network system.
Figure 6:
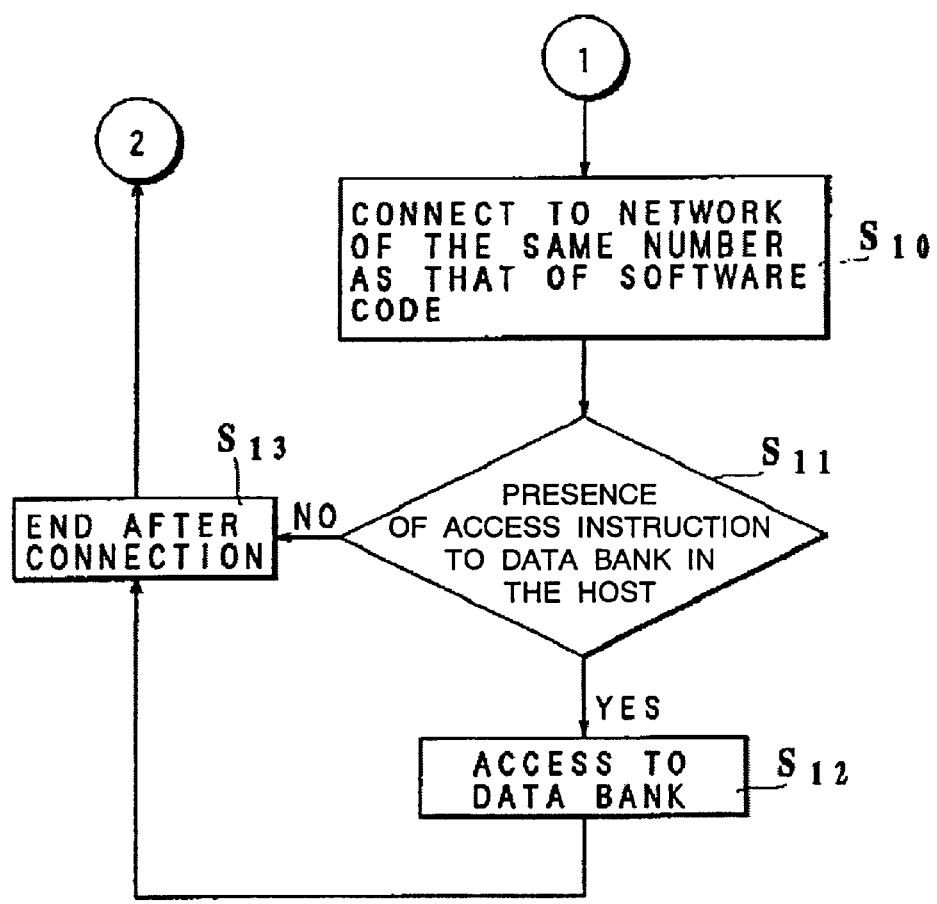

The operation of the network system shown in FIGS. 2 through 4 is shown in flow charts of FIGS. 5 and 6. First, at any of the terminal computers $14_1$, $14_2$, $14_3$, ..., $14_n$, a user can start any of the software programs (step S1). It is assumed for example that the user 200 starts the software 300 and instructions are executed (step S2) in succession. In that case, a determination is made (step S3) whether the instruction s for accessing the host computer 10. If access is unnecessary, the instruction is executed on the terminal computer side only (step S4).

In the case of an instruction for accessing the host computer 10, a CPU 36 in the terminal computer works to access the host computer 10 through a terminal side network interface 40 and the transmission path 12 (step S5). Here, the CPU 36 reads a software code (SC=1) and a personal ID (ID=1) recorded in the software 300, adds them to the instruction, and sends them to the host computer 10.

If the software 300 is started as described above, the software code (SC=1) and the personal ID (ID=1) are recorded in the corresponding software. However, when the software 302 is started, a software code (SC=2) only is recorded in the corresponding software but the personal ID is not recorded. In that case, the user inserts an ID card 306 into a card reader (software interface). The CPU 36 searches the medium inserted into the software interface 34 to obtain a personal ID (ID=1) from the ID card 306. Thus, when the personal ID is not recorded in the started software, the CPU 36 obtains the personal ID from the medium inserted into the software interface of the terminal computer. In other words, the personal ID is confirmed as long as the medium in which the personal ID is recorded is inserted into one of the software interfaces of the terminal computer used.

The host computer 10 receives an instruction, a software code, and a personal ID sent from the terminal computer through a host side network interface 20 as a result of an access. Then, a sub-CPU 22 of the host computer 10 determines whether the software code sent together with the instruction is correct (step S6). In the case of a software code not registered in advance, the access is rejected (step S9), and the process returns to the step S2. In the case of a software code registered in advance, the process goes to the step S7.

In the step S7, the sub-CPU 22 of the host computer 10 determines whether the personal ID sent together with the instruction is correct. In the case of a personal ID not registered in advance, the access is rejected (step S9), and the process returns to the step S2. In the case of a personal ID registered in advance, the process goes to the step S8.

In this way, it is arranged that the access is rejected unless the software code and the personal. ID are authentic.

In the step S8, the sub-CPU 22 determines whether the user is curtly accessing another network by means of the same software code and the same personal ID (step S8). This is intended to prevent the same user from using the same software in another network at the same time and to prevent unauthorized use of a personal ID by more than one person. Therefore, when an access to the network is being made already, a new access to another network is rejected (step S9) and the process returns to the step S2. In the case of a first access, the process goes to the step S10 shown in FIG. 6.

In the step S10, the CPU 24 connects the network patching.interfaces $26_1$, $26_2$, . . . , $26_n$ corresponding to the terminal computers to the network lines $30_1$, $30_2$, . . . , $30_k$ corresponding to the software started in the terminal computers (step S10). In other words, a network forming means is constituted in the step S10 of this embodiment. If necessary here, the CPU 24 reads modules $28_1$, $28_2$, . . . , $28_n$ corresponding to the software from the module memory device 28 and connects them. Therefore, if a software having the same software code is started from a terminal computer, a network is formed together with the host computer.

Next, a determination is made whether an instruction for accessing the host data bank 32 is contained in the software (step S11). If no access is made, the process returns to the step S2 upon completing the connection to the network. If an access is to be made, the access is made to a corresponding data bank 32 (step S12). That is to say, data corresponding to the software in the data bank are combined to form a network. After that, the process returns to the step S2. Thus, the data in the data bank 32 may be used at respective terminal computers.

By the way, this embodiment is arranged so that the steps S1–S5 are processed with the terminal computers and the steps from S6 on are processed with the host computer. Furthermore, the process shown with the steps S1–S5 may be included in the software 300, or may be provided in the form of a record in a separate memory medium.

Figure 1B:
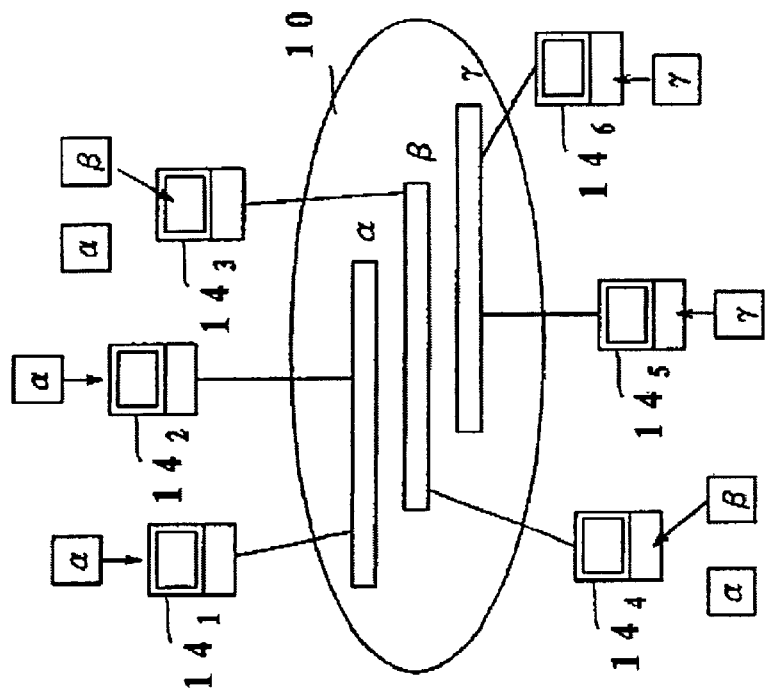
FIG. 1 is a schematic view of a network as an embodiment of the invention.
Figure 1A:
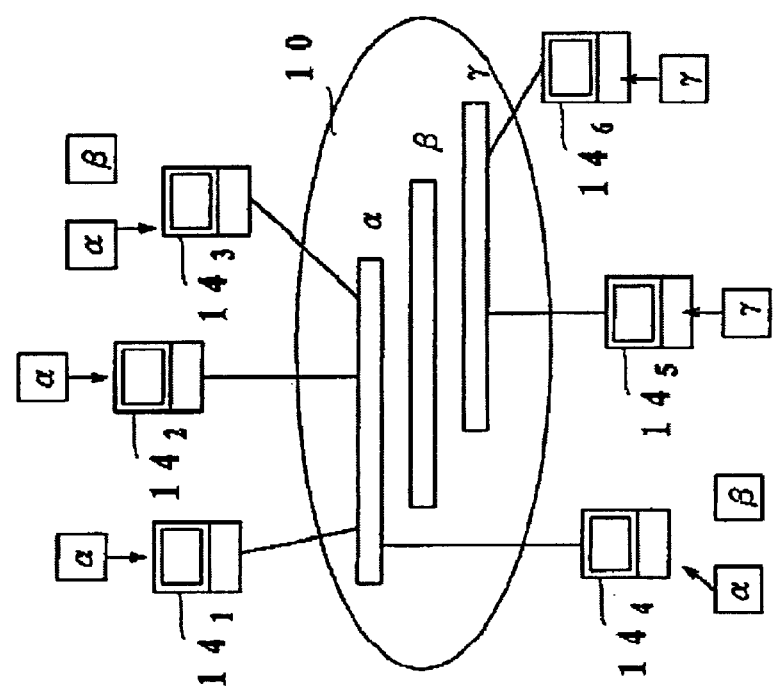

The invention aims at providing a network system having high flexibility and easy changeability. As shown in FIG. 1A, When software programs α, β, and γ are run in terminal computers $14_1$ to $14_6$, the host computer 10 builds software networks α, β, γ. When the software is changed from the program α to β at the terminal computer $14_3$, the terminal computer $14_3$ is switched and connected to the network β. Similarly, the terminal computer $14_4$, is switched and connected to the network β. In other words, a flexible network can be formed in accordance with the software used by the terminal computer. Thus, the terminal computer may be connected to other kind of network easily by changing the software only without changing the hardware structure of the terminal computer.

When the network system described above is used, the number of software programs required for starting on the terminal computer side is minimized and much information is stored in the host data bank 32.

By the way, the host computer 10 in the above embodiment is provided with the module memory device 28. However, if the software started in the terminal computer is made operable without the module, the module need not be connected at the time of forming the network. In that case too, the host data bank 32 is connected to the network.

With this invention, the latest data can be obtained by simply updating the data in the host data bank without changing the software in the terminal computer. For example, this invention is applicable to electronic books in which conclusion and story may be changed, electronic dictionaries in which the contents are variable, personal organizers in which traffic networks and road maps may be updated every year, games in which contents and degree of difficulty may be changed, telephone directories to be updated every year, shopping catalogues in which the contents may be changed, and so on. In particular in those applications, permission or rejection of the access is determined with the software code and personal ID to preclude unauthorized users.

Furthermore, the network Is not formed unless the personal ID is authentic. Therefore, users who are not registered or delaying payment of the network rates are refused use.

Furthermore, since persons who make access to the network are accurately known by the personal IDs, charging of rates (charging to credit cards issuing bills, etc.) is controlled easily.

Figure 7:
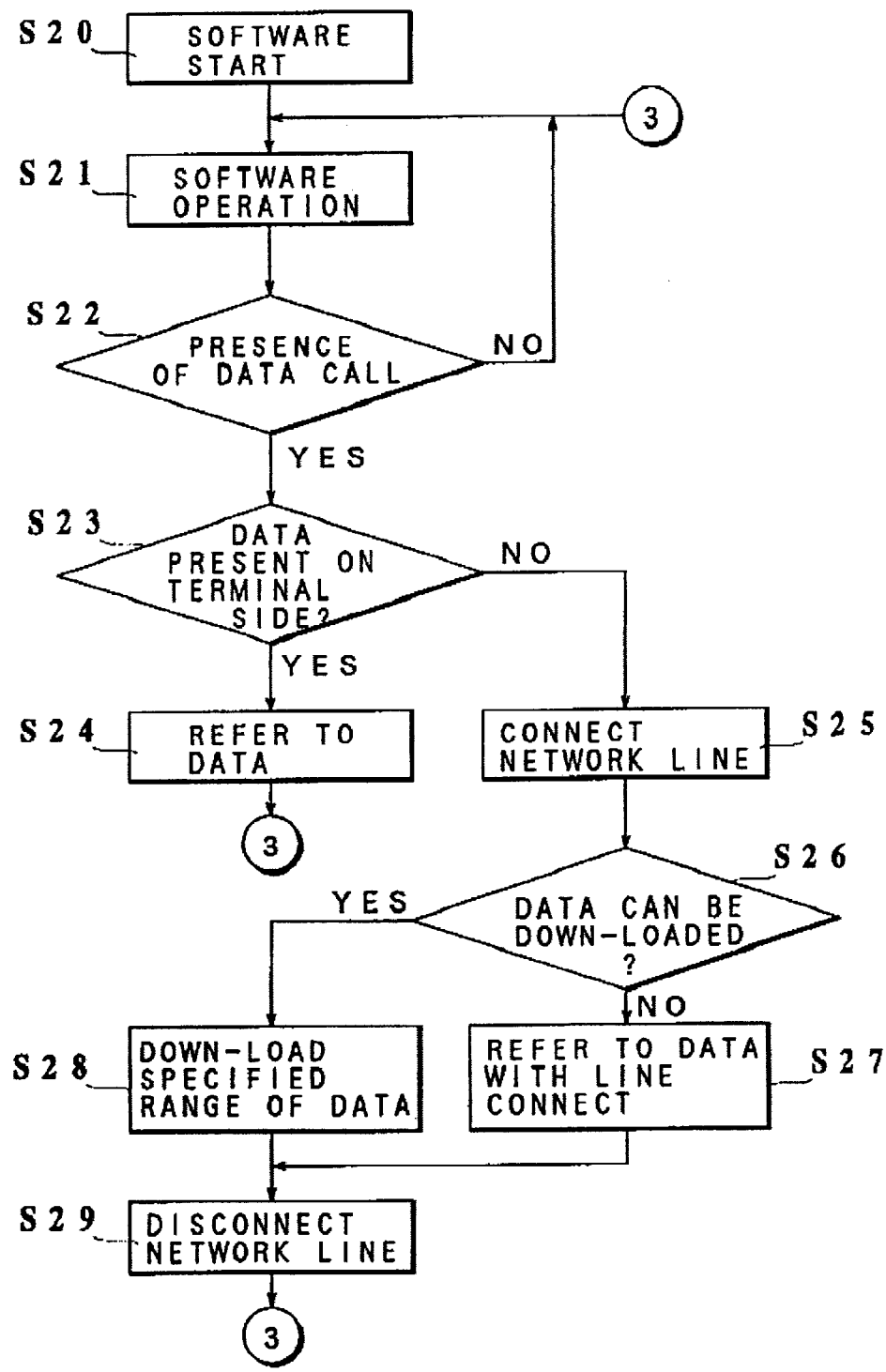
FIG. 7 shows the operation of the network system as another embodiment of the invention.
Figure 8A:
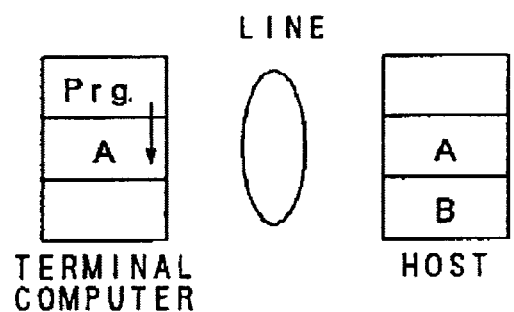
FIG. 8 shows wiring connection of another embodiment.
Figure 8B:
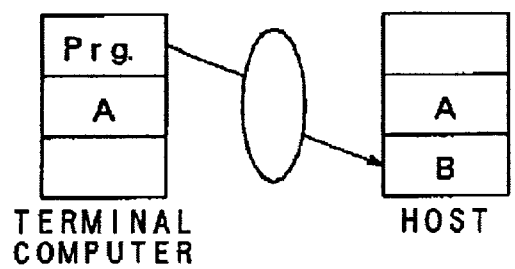
Figure 8C:
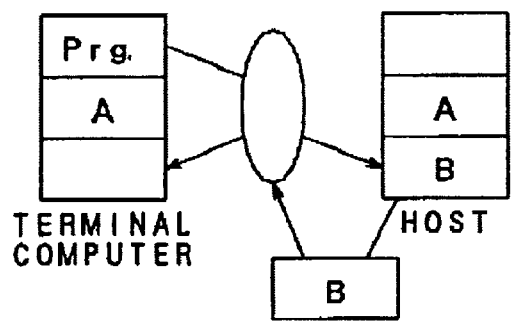
Figure 8D:
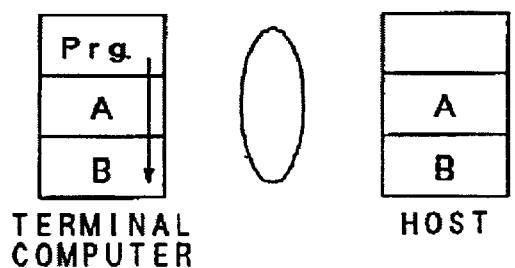
Figure 9:
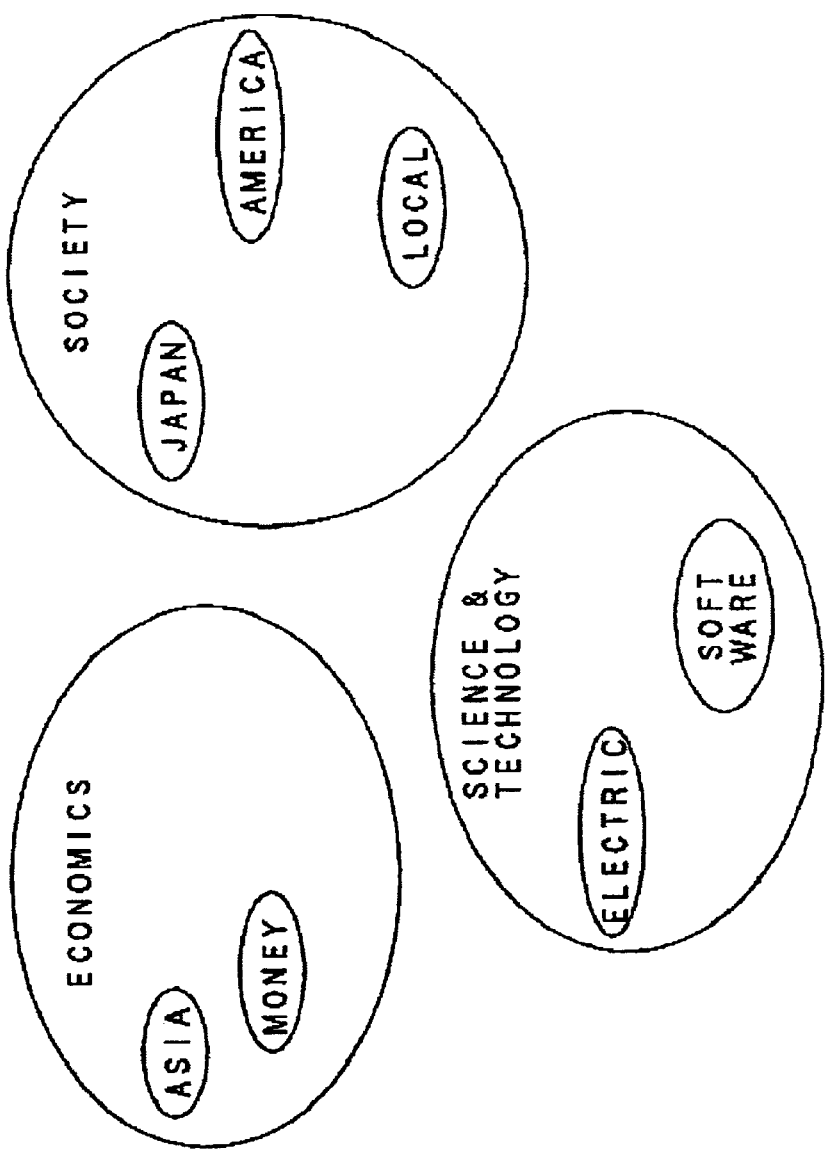
FIG. 9 shows a display example with a display device 37 of a terminal computer.

Next, a network system will be described in reference to FIGS. 7 through 9 in which the host computer 10 is connected through a public line (communication path) to the terminal computers $14_1$, $14_2$, $14_3$, . . . , $14_n$. FIG. 7 is a flow chart showing the operation of the network system. FIG. 8 schematically shows the data acquisition and the line connection. FIG. 9 shows an example of displayed image on the display device 37.

Figure 10:
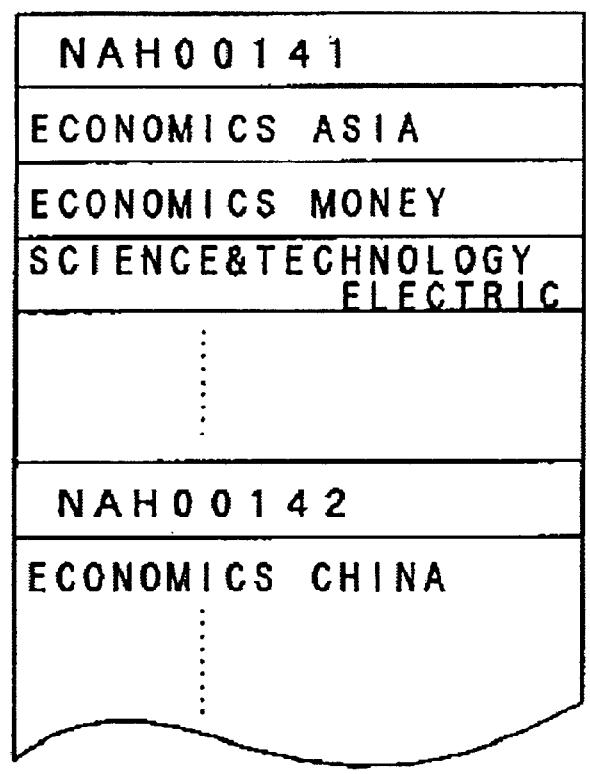
FIG. 10 is a table of relationship between personal IDs and usable software programs stored in the host computer 10.

As shown in FIG. 9, networks that can be accessed on the basis of an ID by a user are displayed on the display screens of the terminal computers $14_1$, $14_2$, $14_3$, . . . , $14_n$. The display is carried out as follows. First, the terminal computers $14_1$, $14_2$, $14_3$, . . . , $14_n$ identify the personal ID by means of the software or ID card. Next, the personal ID is, sent to the host computer 10. As shown in FIG. 10, software programs that can be used by the user are stored, corresponding to the personal ID, in the host computer 10. In the case shown in the drawing, the user of a personal ID "NAH00141" is permitted to use the fields of "Asia" and "Money" out of software programs of economics database. The host computer 10 sends back the softwares that can be used by the user to the terminal computers $14_1$, $14_2$, $14_3$, . . . , $14_n$. The terminal computers. $14_1$, $14_2$, $14_3$, . . . , $14_n$ receive them and display them on the display screen of the display device 37 as shown in FIG. 9.

An operator user uses an input device 39 such as a mouse to start any one of the software programs displayed on the display device 37 (FIG. 7, step S20). For example, it is assumed that the user selects a software program in the "money" field in "economics." The software is started (step S21) and instructions are executed in succession. In that case, a determination is made whether the instruction requires data (step S22). If not, the process returns to the step S21.

If the instruction requires data, the CPU 36 of the terminal computer determines whether the required data are present in the memory device 38 of its own terminal computer (step S23). If present, the data are obtained from the memory device 38 (step S24). In other words, as shown in FIG. 8A, the software Prg obtains data A without a line connection and displays them on the display device.

In the step S23, if no data are present in the memory device 38 of its own terminal computer, the data are assumed to be present in the host computer 10. Therefore, the terminal computer connects the line to the host computer 10 to create a network (step S25). The process of creating the network is the same as that of steps S5 through S13 shown in FIGS. 5 and 6.

Next, the terminal computer determines whether the data may be duplicated (step S26). This determination may be carried out by watching the graph of duplication possibility stored in the host computer 10 together with the data in question. Those prohibited from duplication for the reason of copyright are specified as "NO."

If the data may be duplicated, the terminal computer copies the data from the host computer 10 through the line to its over memory device 38 (this step is referred to as down-load) (step S28). When the down-load is over, the terminal computer disconnects the line connection (step S29). Namely, as shown in FIG. 8C, data B that are not stored on the terminal side are down-loaded from the host computer. If a request for the down-loaded data is made thereafter, the data may be obtained from the memory device 38 without the line connection (Refer to FIG. 8D).

If the step S26 determines that the down-load cannot be made, the terminal computer takes the data B from the host computer 10 in the state of the line being connected (without down-loading to the memory device. 38). This state is shown in FIG. 8B. When the data acquisition is over, the line is disconnected (step S29).

As described above, since it is arranged that the line is connected only when necessary, there is no waste of public line rate even when it is used.

Figure 11:
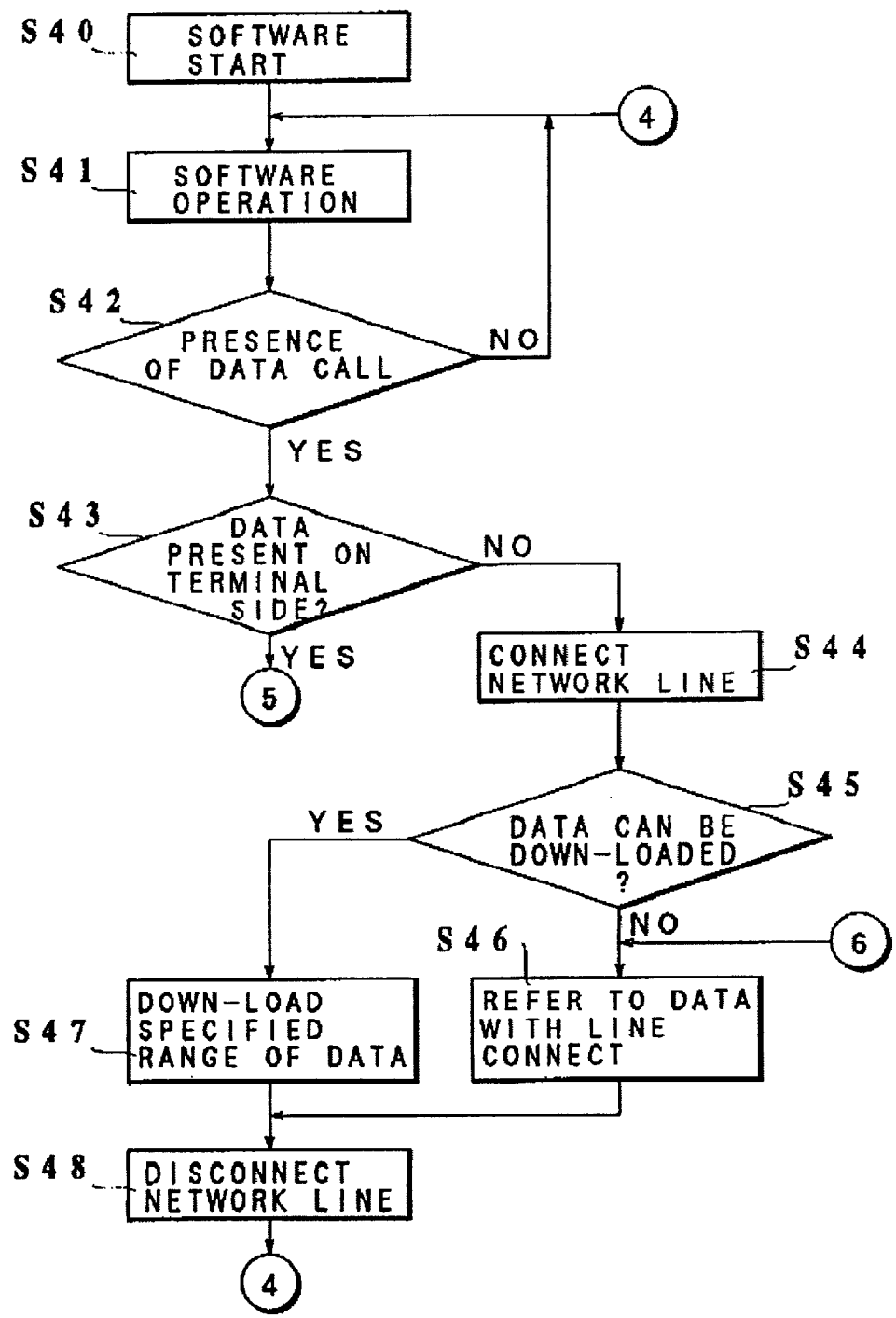
FIG. 11 and FIG. 12 show operation of a network system as another embodiment in which data are updated.
Figure 12:
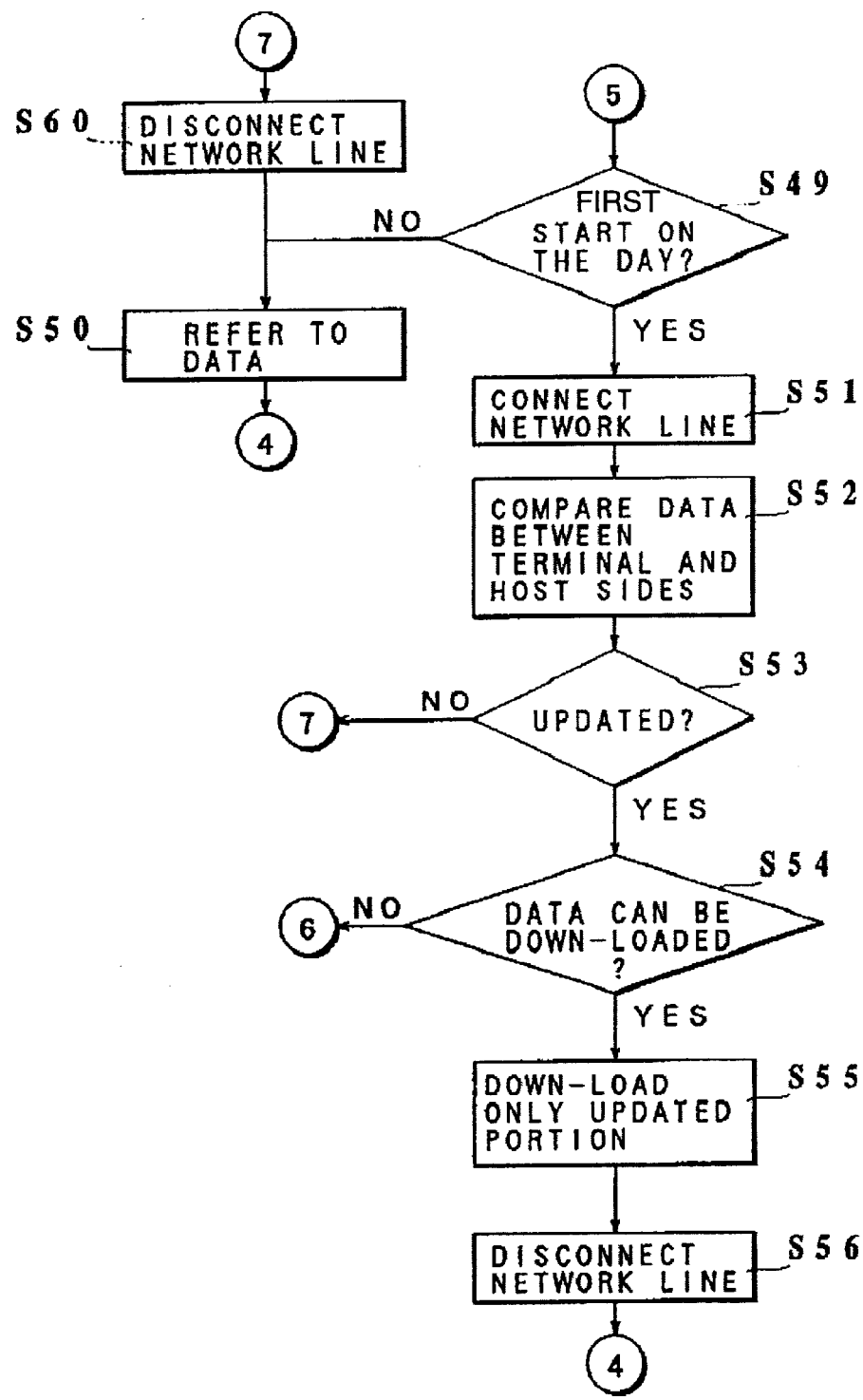

FIGS. 11 and 12 show flow charts of embodiments capable of coping with updates in data in the host computer 10. The process when the data are not present in the terminal computer is the same as that of steps S25 through 29 shown in FIG. 7.

When the data are present in the terminal computer, a determination is made whether the start of the software is the first one on that day (step S49). If a start has been made already, data are obtained from the memory device 38 (step S50). This state corresponds to FIG. 8A. 5

Figure 13A:
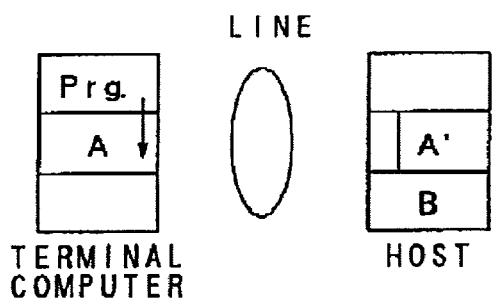
FIG. 13 shows wiring connection of the embodiment shown in FIG. 12.
Figure 13B:
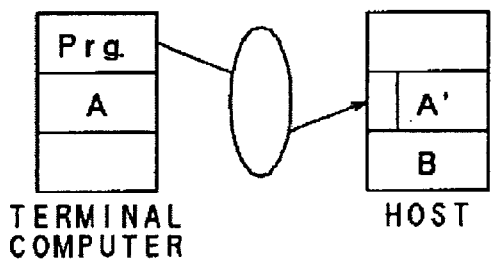

When the start is the first one on that day, the terminal computer makes connection to the line (step S51). Then the data A (FIG. 13A) of the terminal computer are compared with data A' (FIG.13B) of the host computer 10 (steps S52 and 53). If both data are the same as each other, namely if no data update has been made in the host computer 10, the line is disconnected (step S60). After that, data in the terminal computer are taken (step S50). When the data in the host computer 10 is updated to A' as described above, a determination is made whether the updated portion of the data can be down-loaded (step S54).

If the down-load is impossible, the data are obtained from the host computer 10 (not copied) while the line is connected and then the line is disconnected (steps S46 and S48).

Figure 13C:
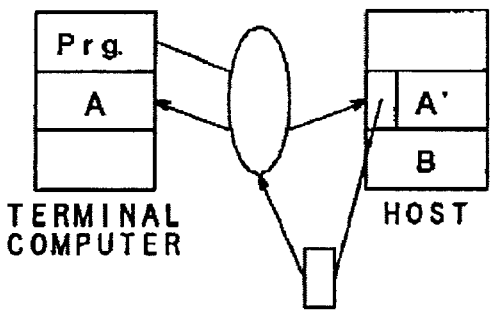
Figure 13D:
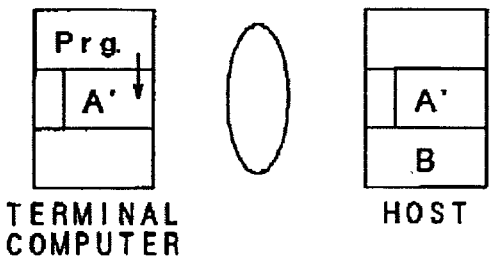
Figure 14:
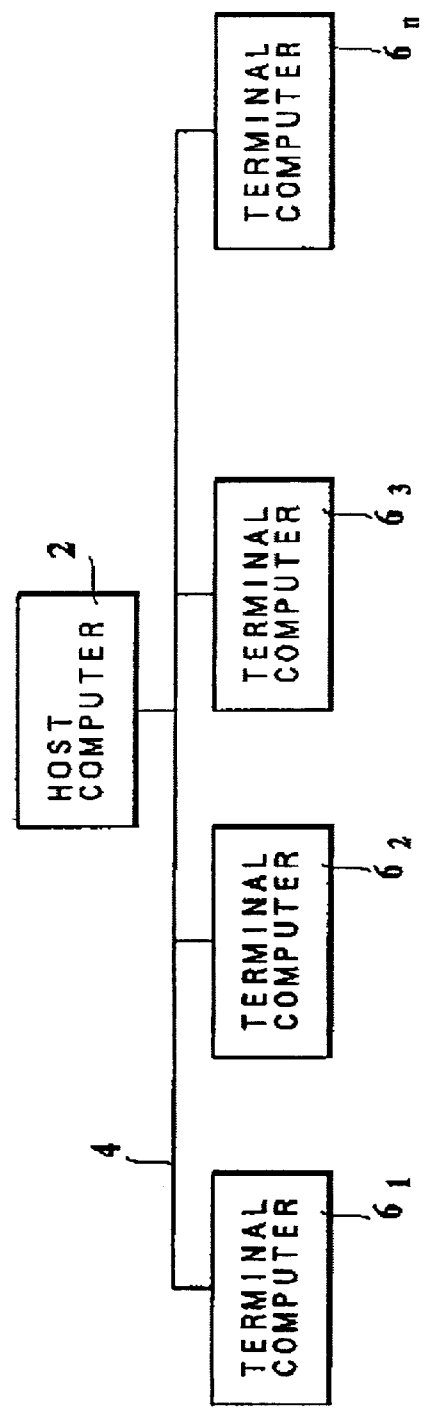
FIG. 14 shows a conventional network system.

If the down load is possible, only the updated portion of the data are down-loaded into the memory device 38 of the terminal computer (step S55).(Refer, to FIG. 13C). After that, the line is disconnected (step S56). Requests for data thereafter are processed according to the data down-loaded into the memory device 38 (FIG. 13D).

With the embodiment described above, data acquisition is possible, also coping with data updates in the host computer.

In the embodiment described above, the determination on the data update is made only for the first start on that day. However, this may be arranged so that the determination is made at every first start in the corresponding week, month, or time of day, etc.

The network management method and the network system are arranged that software started in each terminal computer is provided with a software code in advance and that a network is created with terminal computers operating software having a same software code. Therefore, the network is flexibly changed and formed by simply changing the operating software in respective terminal computers.

The network management method and the network system are arranged such that a host computer determines the authenticity of a user ID sent from each of the terminal computers and permits access to the host computer only when the user ID is authentic and creates a network. Therefore, the network is prevented from unauthorized use through the terminal computer. In other words, each user can be managed.

The network connection possibility display method is arranged that accessible networks only are displayed on a display device on the basis of user ID codes. Therefore, the terminal computer user can easily know the possibility of connection to the network.

The network management method and the network system are arranged that the host computer creates a network by interconnecting the programs or data when creating the network with terminal computers that are operating software having the same software code. Therefore, a program does not operate and data cannot be taken out from the terminal computer unless a network is created. The network management method and the network system are arranged that when a software run in a terminal computer requests data and the data are stored in the terminal computer, the data are obtained from the terminal computer and that when the data are stored in a host computer, the terminal computer is connected to the host computer through a communication path and the data are obtained from the host computer. Therefore, the communication path is connected only when it is needed.

The network management method and the network system are arranged that when data to be obtained are stored in a host computer but cannot be copied, the terminal computer is connected to the host computer through a communication path, the data in the host computer are obtained while both of the computers remain in the connected state and then the connection is broken. Therefore, the communication path is connected only when it is needed and the data updated in the host computer may be used in the terminal computer.

What is claimed is:

1. A network management method for a system having a host computer and a plurality of terminal computers connected to the host computer through a communication path, wherein:

software programs operated by the terminal computers are each associated with a software code in advance, and the host computer creates a network of at least some of the terminal computers operating the software programs that have the same software code;

wherein each user has a user identification code and the host computer determines the authenticity of user identification codes sent from the terminal computers, permits access to the host computer only when the user identification codes are authentic, and creates a network, and wherein the terminal computers have display devices displaying only networks that are accessible based on the user identification code.

2. The network management method of claim 1, wherein;

programs or data corresponding to respective networks are stored in the host computer, and the host computer combines the programs or data when creating the network by interconnecting the ten computers that are operating software programs having the same software code.

3. The network management method of claim 1 wherein;

when a software program running on a terminal computer requests data and the data are stored in the terminal computer, the data are obtained from the terminal computer, and when a software program running on a terminal computer requests data and the data are stored in a host computer, the terminal computer is connected to the host computer through a communication path and the data are obtained from the host computer.

4. The network management method of claim 3, wherein, when the data to be obtained are stored in the host computer, the terminal computer is connected to the host computer through the communication path, the data are obtained from the host computer and the communication path between the terminal computer and the host computer is broken thereafter.

5. The network management method of claim 3, wherein, when data to be obtained are stored in both the host computer and the terminal computer, the terminal computer is connected to the host computer through the communication path, the data in the host computer are compared with the data in the terminal computer and, if the data in the host computer have been updated, the communication path is broken after at least the updated portion of the data are copied and stored from the host computer to the terminal computer, and if both data are identical to each other, the communication path is broken.

6. The network management method of claim 3, wherein, when data to be obtained are stored in the host computer, the terminal computer is connected to the host computer trough the communication path, the data in the host computer are copied and stored in the terminal computer, then the communication path between the host computer and the terminal computer is broken, and thereafter the data are obtained from the terminal computer.

7. The network management method of claim 6, wherein, when data to be obtained are stored in the host computer but cannot be copied, the terminal computer is connected to the host computer through the communication path, the data in the host computer are obtained while both of the host computer add the terminal computer are connected by the communication path and then the communication path is broken.

8. The network management method of claim 3, wherein, the host computer determines authenticity of a user identification sent from each of the terminal computers and permits connection to the host computer only when the user identification is authentic.

9. A network system having a host computer and a plurality of terminal computers connected to the host computer, wherein:

each of the terminal computers comprises:
reading means for reading a software code contained in a software program started in the terminal computer,
transmitting means for transmitting, through a communication path, the software code read by the reading means, and
display means for displaying only networks that are accessible as a selectable state on the display means based on the user identification code;

the host computer comprises:
receiving means for receiving the software codes transmitted from the terminal computers, and
network forming means for creating a network by interconnecting the terminal computers that are operating software programs having the same software code among the software codes received by the receiving means, wherein the network forming means determines the authenticity of a user identification transmitted from each of the terminal computers and permits access to the host computer only when the user identification is authentic.

10. The network system of claim 9, wherein, the host computer further comprises memory means for storing programs or data corresponding to respective networks, and the network forming means combines the programs or data from among those stored in the memory means and corresponding to the network when creating the network by interconnecting terminal computers that are operating software programs having the same software code.

11. The network system of claim 9, wherein:

each of the terminal computers comprises;
data presence determination means which, upon receiving a data request instruction, determines whether the data are stored in its own terminal computer, and
data obtaining means which, when the data are determined to have been stored in its own terminal computer, obtains the data from its own terminal computer, and when the data are determined not to have been stored in its own terminal computer, obtains the data from the host computer by connecting a communication path and then breaks the communication path, and that:
the host computer comprises;
data transmission means for transmitting the data through the communication path in response to a data request from any of the terminal computers.

12. The network system of claim 11, wherein when the data to be obtained are stored in the host computer, the data obtaining means connects the host computer to the terminal computer through the communication path, obtains data from the host computer while both the host computer and the terminal computer are connected by the communication path, and the communication path is broken thereafter.

13. The network management system of claim 11, wherein, when data to be obtained are stored in both the host computer and the terminal computer, the data obtaining means connects the terminal computer to the host computer through the communication path, compares the data in the host computer with the data in the terminal computer and, if the data in the host computer have been updated, the data obtaining means breaks the communication path between the host computer and the terminal computer after at least the updated portion of the data are copied and stored from the host computer to the terminal computer, and if both data are identical to each other, the data obtaining means breaks the communication path in that state.

14. The network system of claim 11, wherein, when data to be obtained are stored in the host computer, the data obtaining means connects the terminal computer to the host computer through the communication path, copies and stores the data from the host computer to the terminal computer, then breaks the communication path, and thereafter the data are obtained from the terminal computer.

15. The network systems of claim 14, wherein, when data to be obtained are stored in the host computer but cannot be copied, the data obtaining means connects the terminal computer to the host computer through the communication path, obtains the data in the host computer while both of the host computer and the terminal computer are connected by the communication path, and then the communication path is broken.

16. A network management method of claim 11, wherein, the host computer determine the authenticity of a user identification transmitted from each of the terminal computers and permits connection to the host computer only when the user identification is authentic.

17. A host computer for creating a network between plural terminal computers connected to the host computer through a communication path, wherein;

the terminal computers have at least one software program having software code, and the host computer creates the network of at least some of the terminal computers operating the software program that has the same software code;

wherein each user has a user identification code and the host computer determines the authenticity of user identification codes sent from the terminal computers, permits access to the host computer only when the user identification codes are authentic, and creates a network, and wherein the terminal computers have display devices displaying only networks that are accessible as a selectable state based on the user identification code.

18. A program storage medium readable by a computer, storing a plurality of instructions to be executed by a host computer for managing a plurality of By terminal computers connected to the host computer through a communication path the plurality of instructions comprising:

receiving software codes that are associated with software programs operated by the terminal computers, determining authenticity of user identification codes sent from the terminal computers, permitting access to the host computer only when the user identification codes are authentic, and creating a network of at least some of the terminal computers operating the software programs that have the same software code, wherein the host computer sends information of which networks are accessible based on the user identification code for the user to the terminal computer of the user so that the terminal computer of the user has a display device which displays only networks tat are accessible as a selectable state on the display device.

* * * * *